Oct. 2, 1923.

C. E. GILLAM 1,469,506

AUTOMOBILE PULLING DEVICE

Filed Dec. 15, 1921

Inventor
C. E. Gillam

By Mason, Fenwick & Lawrence
Attorneys

Patented Oct. 2, 1923.

1,469,506

UNITED STATES PATENT OFFICE.

CHARLES EVERT GILLAM, OF CENTRALIA, MISSOURI.

AUTOMOBILE PULLING DEVICE.

Application filed December 15, 1921. Serial No. 522,620.

*To all whom it may concern:*

Be it known that I, CHARLES EVERT GILLAM, a citizen of the United States, residing at Centralia, in the county of Boone and State of Missouri, have invented certain new and useful Improvements in Automobile Pulling Devices; and I do hereby declare the following to be a full, clear, and exact description of the invention, such as will enable others skilled in the art to which it appertains to make and use the same.

This invention relates to new and useful improvements in attachments for automobiles and more particularly to an automobile pulling device, the main object of the present invention being the provision of a pulling device adapted to be applied to the driving wheels of a motor vehicle and used for pulling the vehicle out of a mud hole, or any other place where it is impossible for the driving wheels to obtain sufficient grip to remove the vehicle through their own momentum.

Another object of this invention is the provision of a device adapted to be applied to one of the driving wheels of a motor vehicle to provide a suitable drum upon which a pulling cable is wound through the rotation of the driving wheels, the other end of said cable being attached to a stationary object removed from the vehicle whereby the winding of the cable upon the drum attached to the driving wheels will extricate the vehicle from the mud hole or other location in which the same may be stuck.

A further object of the invention is the provision of a pulling device which can be folded into compact form so as to occupy a minimum space to be carried about in the body of the vehicle and can be quckly and readily unfolded and attached to the driving wheels of the vehicle.

With the above and other objects in view, the invention consists in the novel features of construction, combination and arrangement of parts hereinafter more fully set forth, pointed out in the claims and shown in the accompanying drawings, in which:

Figure 1:
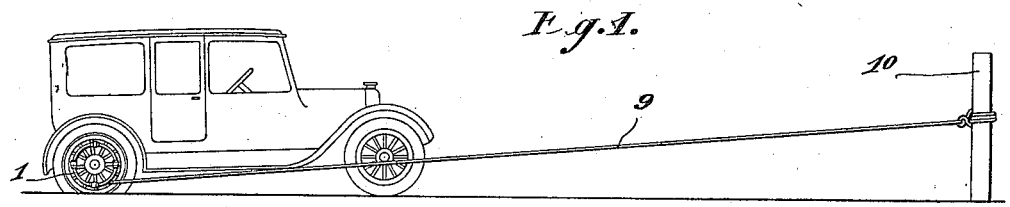
Figure 1 is a diagrammatic view showing the application of my improved pulling device.

As a general rule, it is rather difficult to extricate a motor vehicle from a sump or any soft porous ground where the weight of the vehicle forces the treads of the wheels into the material through which the vehicle is passing, and in order to provide a device which can be readily carried about in the body of the vehicle and occupy a minimum space and which can be quickly and readily attached to the driving wheels of a motor vehicle to provide a drum upon which a cable, which has been previously secured at its opposite end to a stationary object on a firm foundation, so that through the rotation of the driving wheels the motor vehicle can be readily extricated from the sump or other soft material through its own power, I have provided a body ring generally indicated by the numeral 1 having arranged at equal spaced intervals throughout the circumference of the ring, a plurality of bearing sleeves 2 upon which are mounted hook members.

These hook members each comprise a shank 3 having one end reduced and then bent upon itself to form a collar 4 which is mounted for rotation upon one of the bearing sleeves 2, the extreme end of the shank being fastened to the body of the shank by means of rivets 5 or other suitable fastening means.

Figure 2:
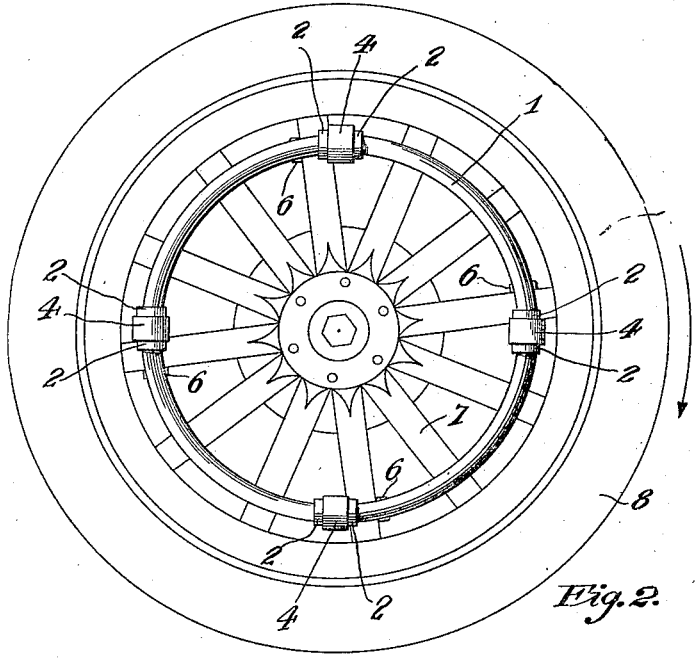
Fig. 2 is a side elevation of a motor vehicle wheel showing my improved device applied thereto.
Figure 3:
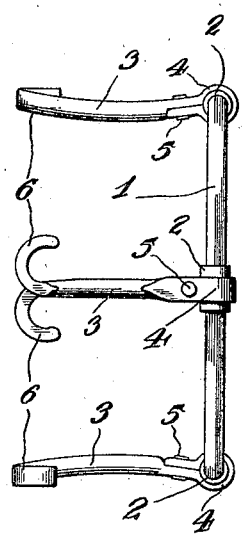
Fig. 3 is a side elevation of the pulling device.

Formed at the outer ends of the shanks 3 are the hook members 6. These hook members are arranged in a substantial circle, the hook members when in an operative position as shown in Fig. 3, being disposed in direct alignment with the body ring 1 and from this position, these hooks 6 may be readily engaged with the spokes 7 of the vehicle wheel 8 as clearly illustrated in Fig. 2. Attention is called to the fact that when these hooks 6 are engaged with the spokes of the vehicle wheel, the shanks 3 of the hooks for a suitable drum, each of said shanks being slightly bowed so that the cable 9 may be evenly wound thereon.

In extricating a motor vehicle from a sump or the like, the cable 9 is first attached at one end to a stationary object, which in the present instance, is shown in the form of a post 10 driven into the earth at a spot removed from the sump or wherever a firm portion of earth may be located directly in front of the vehicle. The other end of the cable is then attached to one of the shanks 3 and by applying power to the driving wheels of the vehicle, the cable 9 will tend to be wound upon the shanks 3 which form the drum, thus moving the vehicle forward as the cable 9 winds upon the drum. It may be found necessary in traveling in certain districts and certain parts of the country to carry in the body of the vehicle, a suitable stake to be used when the wheels of the vehicle become imbedded in such a position in a sump that it cannot be removed without the application of a pulling device.

Figure 4:
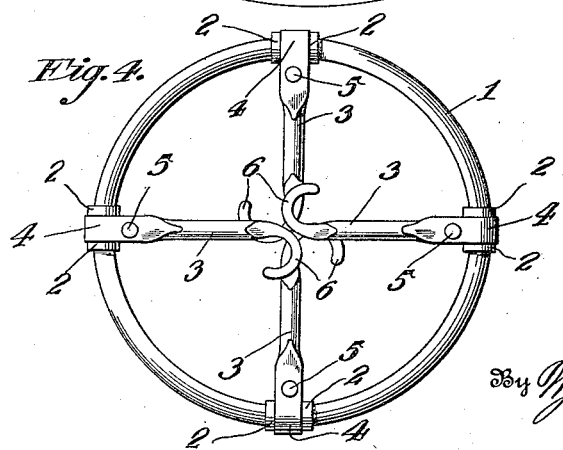
Fig. 4 is a plan view showing the same in a folded position.

In Fig. 4, I have illustrated my improved pulling device in a folded position, each of the hook members 6 being arranged in the center of the ring 1 and so positioned that the device may be readily placed under one of the seats of the vehicle or in any other place and occupy a minimum space and when it is determined to use the device, it can be removed and the shanks 3 moved outwardly to a right angle position with respect to the ring 1 as shown in Fig. 3, and the hooks 6 readily engaged with the spokes of one of the driving wheels to form a drum upon which the cable 9 is wound through the rotation of the driving wheels.

From the above description taken in connection with the accompanying drawings, it will be readily apparent that my improved pulling device for motor vehicles is so constructed and arranged that it can be readily folded into compact form when not in use and carried in any convenient space in the vehicle and readily set up and attached to the driving wheels of the vehicle when it is necessary to use the same. The device in itself is extremely simple in construction and can be manufactured and placed upon the market at a comparatively small cost.

I claim:

1. A pulling device of the class described including a body ring, a plurality of hooks pivotally mounted upon said body ring and disposed in spaced relation circumferentially of the ring and adapted to be disposed at right angles to the plane of said body ring, or folded in adjacent each other to lie substantially in the same plane as the ring as and for the purpose set forth.

2. A pulling device including a body ring, spaced bearing sleeves mounted upon said ring, hook members having sleeves at one end and being pivotally mounted upon said bearings so as to extend at right angles to the plane thereof or to lie folded in the plane thereof, and hook portions formed at the outer ends of said hook members being disposed circumferentially of the body ring, as and for the purpose set forth.

3. The combination with a motor vehicle wheel and the spokes therein, of a pulling device including a body ring, hooks pivotally mounted upon said ring so as to extend at right angles to the plane thereof or to lie folded in the plane thereof, said hook portions being adapted for engagement with the spokes of the wheel whereby the shanks of said hook members form a drum adapted for rotation with the wheel.

4. A pulling device comprising a body ring, hook members pivotally connected with said ring at their inner ends and arranged in spaced relation, said hook members being normally folded inwardly toward the center of said ring and adapted to be moved outwardly at right angles to the ring whereby to form a winding drum, and the hooks in extended position being symmetrical to the axis of the drum formed by the hook members.

In testimony whereof I affix my signature.

CHARLES EVERT GILLAM.